(12) United States Patent  
Harada

(10) Patent No.: US 12,242,128 B2  
(45) Date of Patent: Mar. 4, 2025

(54) LENS BARREL AND IMAGE PICKUP APPARATUS

(71) Applicant: CANON KABUSHIKI KAISHA, Tokyo (JP)

(72) Inventor: Shinichiro Harada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 517 days.

(21) Appl. No.: 17/558,150

(22) Filed: Dec. 21, 2021

(65) Prior Publication Data

US 2022/0206241 A1  Jun. 30, 2022

(30) Foreign Application Priority Data

Dec. 24, 2020 (JP) ................................ 2020-215210

(51) Int. Cl.  
*G02B 7/02* (2021.01)  
*G02B 5/00* (2006.01)

(52) U.S. Cl.  
CPC ............. *G02B 7/021* (2013.01); *G02B 5/005* (2013.01)

(58) Field of Classification Search  
None  
See application file for complete search history.

(56) References Cited

U.S. PATENT DOCUMENTS

2011/0096420 A1* 4/2011 Sato .................. G02B 7/026  
359/822

FOREIGN PATENT DOCUMENTS

| JP | H05281590 A | 10/1993 |
|---|---|---|
| JP | H0854552 A | 2/1996 |
| JP | 08-254643 A | 10/1996 |
| JP | 09-61684 A | 3/1997 |
| JP | H09197235 A | 7/1997 |
| JP | 2848413 B2 * | 1/1999 |
| JP | 2011039443 A | 2/2011 |
| JP | 2013205693 A | 10/2013 |
| JP | 2014038213 A | 2/2014 |
| JP | 2014164049 A | 9/2014 |

(Continued)

OTHER PUBLICATIONS

The Aug. 6, 2024 Japanese Office Action, which is enclosed without an English Translation, that issued in Japanese Patent Application No. 2020-215210.

(Continued)

*Primary Examiner* — Bao-Luan Q Le  
*Assistant Examiner* — Danell L Owens  
(74) *Attorney, Agent, or Firm* — Cowan, Liebowitz & Latman, P.C.

(57) ABSTRACT

A lens barrel for providing a compact lens barrel capable of suppressing ghosts and flares includes a first lens holding portion that holds a first lens; and a second lens holding portion that holds a second lens disposed further toward an image plane side than the first lens, wherein the outer diameter of the first lens is larger than the outer diameter of the second lens, wherein a plurality of through-holes along the optical axis direction of the first lens and the second lens is provided in the second lens holding portion, and wherein the first lens holding portion includes a plurality of protrusions arranged so as to overlap the plurality of through-holes if viewed from an object side along the optical axis direction.

12 Claims, 15 Drawing Sheets

(56) References Cited

FOREIGN PATENT DOCUMENTS

JP          2017223829 A     12/2017

OTHER PUBLICATIONS

The above foreign patent document was cited in the Nov. 5, 2024 Japanese Office Action, which is enclosed without an English Translation, that issued in Japanese Patent Application No. 2020-215210.

* cited by examiner 84  85

LENS BARREL AND IMAGE PICKUP APPARATUS

BACKGROUND OF THE INVENTION

Field of the Invention

The present invention relates to a lens barrel and like that can suppress ghosts and flares.

Description of the Related Art

In an environment including strong light such as sunlight or the headlights of a vehicle, many ghosts and flares due to stray light overlap on an object when an image is acquired using a camera. Conventionally, a method for reducing stray light reflected by the inner wall of a lens barrel in a lens unit has been known. In particular, the higher a zoom rate is, ghosts and flares become significantly more easily to occur. Accordingly, devices that physically separate the inner wall surface from the stray light is necessary, in addition to disposing a light shielding member inside the lens barrel or applying a roughening process to the surface of the inner wall of the lens barrel by embossing or the like. However, there is a disadvantage in which the size of the lens barrel easily increases.

In contrast, in an optical device using optical members such as a lens and a mirror, the shape of a member for holding the optical member is devised for various purposes. In Japanese Patent Application Laid-Open Publication No. 08-254643, a through-hole penetrating a lens barrel and an opening/closing means for the hole are provided for removing dust from inside the lens barrel. Japanese Patent Application Laid-Open Publication No. 08-254643 discloses a configuration in which compressed air is fed into the hole and dust is pushed out of the lens barrel via the through-hole.

In Japanese Patent Application Laid-Open No. 09-61684, a member for pushing a mirror and a member for pressing the mirror are provided and an air escape hole is provided on the bottom of the mirror on which the member for pushing the mirror is located for the purpose of facilitating mirror replacement for an inverted microscope. A mirror holding structure thus capable of preventing the deterioration of the mirror surface accuracy due to air compression when the mirror is attached is disclosed.

However, if the prior art disclosed in Japanese Patent Application Laid-Open No. 08-254643 is applied to a lens holding structure in which ghosts and flares can be suppressed while holding a lens, it becomes difficult to physically separate the inner wall of the lens holding member, which causes the ghosts and flares, from the effective ray. Additionally, the diameter of the lens holding member become increased, and as a result, the size of the lens barrel itself may increase.

SUMMARY OF THE INVENTION

An object of the present invention to provide a lens barrel capable of suppressing ghosts and flares.

A lens barrel comprising: a first lens holding portion that holds a first lens; and a second lens holding portion that holds a second lens disposed further toward an image plane side than the first lens, wherein the outer diameter of the first lens is larger than the outer diameter of the second lens, wherein a plurality of through-holes along the optical axis direction of the first lens and the second lens is provided in the second lens holding portion, and wherein the first lens holding portion includes a plurality of protrusions arranged so as to overlap the plurality of through holes if viewed from an object side along the optical axis direction.

Further features of the present invention will become apparent from the following description of embodiments with reference to the attached drawings.

DESCRIPTION OF THE EMBODIMENTS

Hereafter, with reference to the accompanying drawings, favorable mode of the present invention will be described using Embodiments. In each diagram, the same reference signs are applied to the same members or elements, and repeated description will be omitted or simplified.

In the Embodiments below, an example in which a network camera serving as an image pickup apparatus is applied will be described. However, the image pickup apparatus also includes electronic devices having an image pickup function such as a digital still camera, a digital movie camera, a smartphone with a camera, a tablet computer with a camera, or an on-vehicle camera.

Embodiment 1

Figure 1:
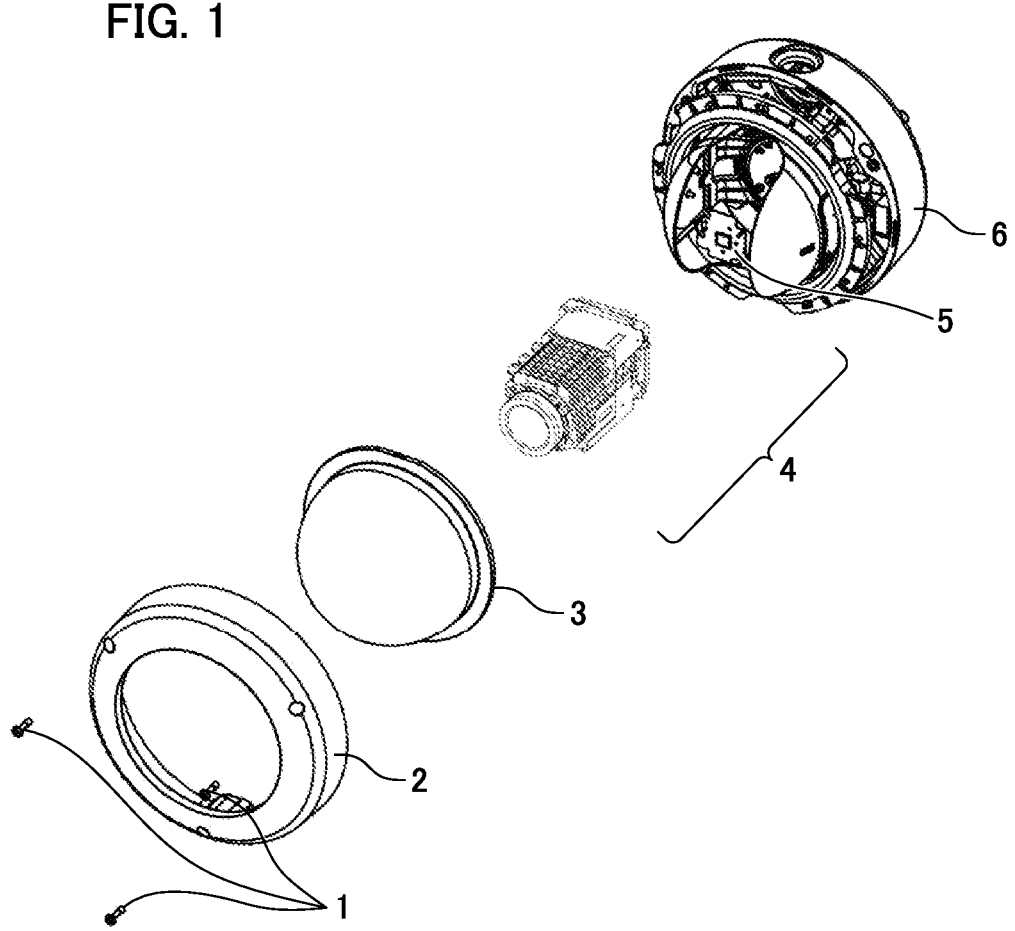
FIG. 1 is an exploded perspective view of a network camera serving as an image pickup apparatus according to Embodiments of the present invention.

FIG. 1 is an exploded perspective view of a (network) camera 36 serving as an image pickup apparatus according to Embodiment 1 of the present invention. An image pickup element unit 5 holds imaging elements such as a CCD sensor and a CMOS sensor and is attached to a zoom lens barrel 4.

A panning/tilting rotation unit 6 holds the zoom lens barrel 4 rotatably in the panning, tilting, and rotation directions. A dome cover 3 is fastened with fastening screws 1 in a state of being held between the cover 2 and the panning/tilting rotation unit 6.

Figure 2:
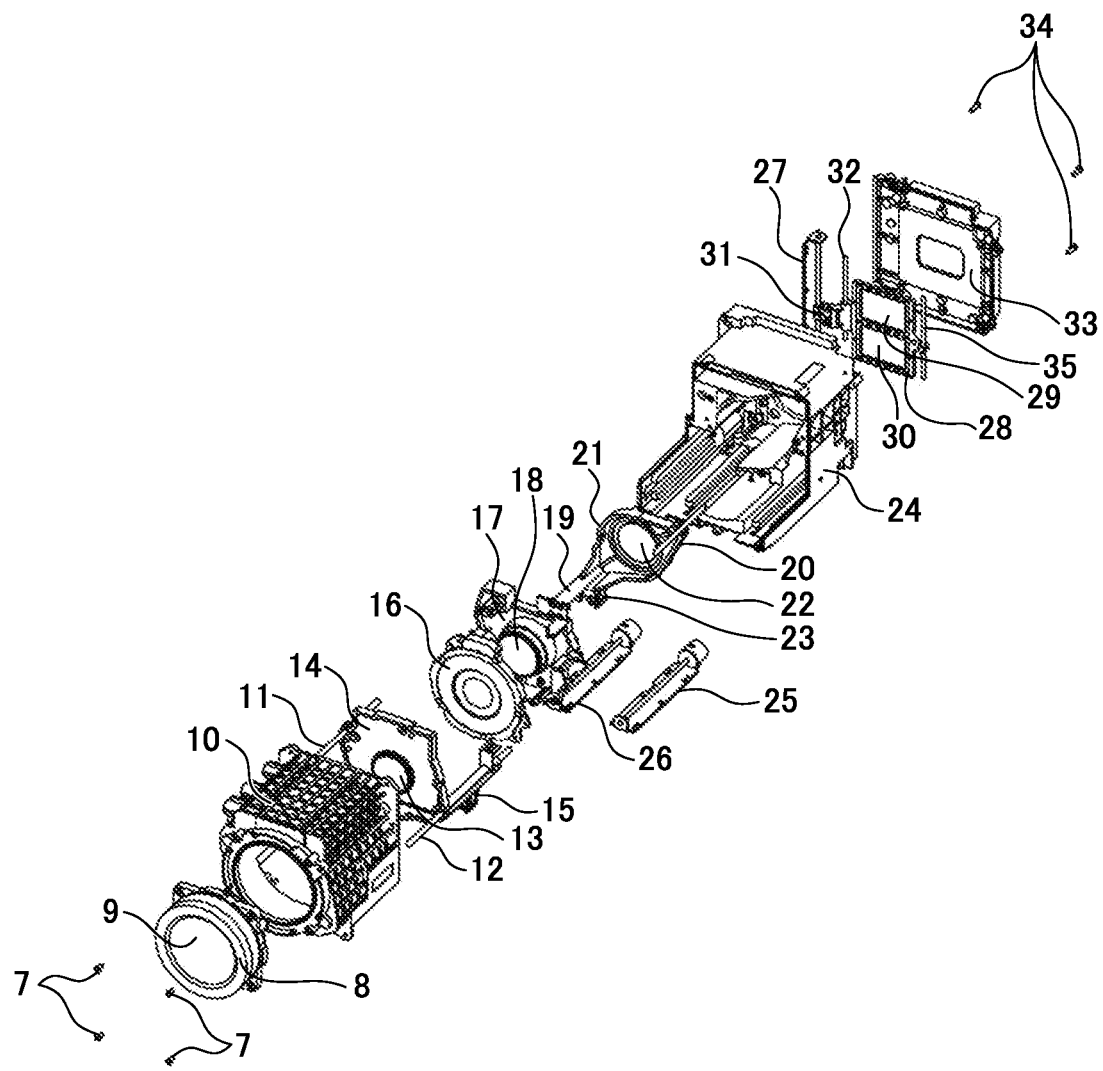
FIG. 2 is an exploded perspective view of a zoom lens barrel 4 according to Embodiment 1.

FIG. 2 is an exploded perspective view of the zoom lens barrel 4. The zoom lens barrel 4 has four lens groups. A lens 9 is a fixed group fixed (immovable) in the optical axis direction. A zoom lens 13 moves in the optical axis direction to perform a magnification operation. A focus lens 22 moves in the optical axis direction to perform a focusing operation.

A fixed lens frame 8 is fixed with screws 7 to a front side fixing frame 10. The front side fixing frame 10 is connected with screws (not illustrated) to a rear side fixing frame 24. Guide bars 11, 12, 19, and 20 are fixed in a state of being held between the front side fixing frame 10 and the rear side fixing frame 24.

A lens moving frame 14 holds the zoom lens 13 and is movably supported in the optical axis direction by the guide bar 12. A U groove on the lens moving frame 14 engages with a U groove on the guide bar 11, so that the rotation of the lens moving frame 14 around the guide bar 12 is limited.

A rack 15 is fixed to the lens moving frame 14 in a state of being biased in the optical axis direction and the rotation direction by a rack spring (not illustrated). The rack 15 engages with a screw part of a stepping motor 25 and moves in the optical axis direction together with the lens moving frame 14 by the rotation of the screw part.

The diaphragm unit 16 is fixed with screws (not illustrated) to a lens fixing frame 17, which holds a lens 18, and adjusts an amount of incident light incident on the zoom lens barrel 4 by changing the aperture diameter into a plurality of states.

A lens moving frame 21 holds the focus lens 22 and is supported movably in the optical axis direction by the guide bar 19. The U groove on the lens moving frame 21 engages with the U groove on the guide bar 20, so that the rotation of the lens moving frame 21 around the guide bar 19 is limited.

A rack 23 connecting to the lens moving frame 21 is fixed to the lens moving frame 21 in a state of being biased in the optical axis direction and the rotation direction by a rack spring (not illustrated). The rack 23 engages with a screw part of a stepping motor 26 and moves in the optical axis direction together with the lens moving frame 21 by the rotation of the screw part.

A filter moving frame 28 holds an infrared cut filter 29 and a glass member 30, is supported movably along a direction perpendicular to the optical axis by a guide bar 32 and is selectively arranged on the optical axis. A U groove on the filter moving frame 28 engages with a U groove on a guide bar 35, so that the rotation of the filter moving frame 28 around the guide bar 32 is limited.

A rack 31 connecting to the filter moving frame 28 is fixed to the filter moving frame 28 while being biased in the optical axis direction and the rotation direction by a rack spring (not illustrated). The rack 31 engages with a screw part of a stepping motor 27 and moves in a direction perpendicular to the optical axis together with the filter moving frame 28 by the rotation of the screw part.

Shooting of an object is made possible even at night by retreating the infrared cut filter 29 from the optical path. A sensor holder 33 holds the image pickup element unit 5 by using an imaging element screw (not illustrated) and is fixed with screws 34 to the rear side fixing frame 24.

A photo-interrupter (not illustrated) that is fixed to an FPC (flexible printed circuit board) by soldering is used for detecting the original position of the movement of the lens moving frames 14 and 21 in the optical axis direction. The FPC is connected to the diaphragm unit 16, the stepping motors 25, 26, and 27, and a photo-interrupter (not illustrated), and each of them is activated by energization.

The photo-interrupter is located on the moving regions of the lens moving frames 14 and 21, and the positions of the lens moving frames 14 and 21 are controlled by the output of the photo-interrupter and the number of driving pulses of the stepping motors 25 and 26.

Figure 3:
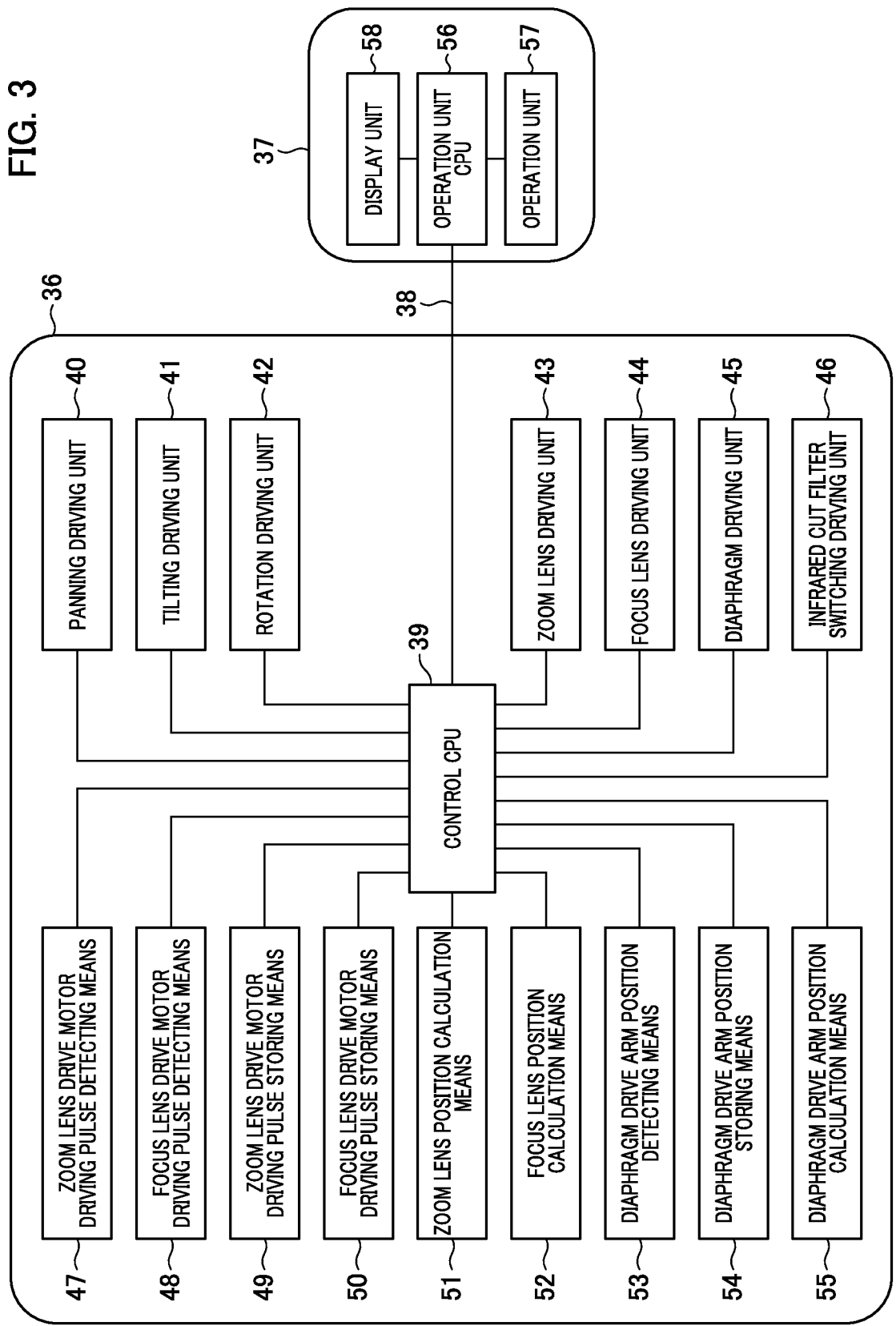
FIG. 3 is a block diagram illustrating a configuration of the image pickup apparatus according to Embodiment 1.

FIG. 3 is a block diagram illustrating a configuration of an image pickup apparatus according to Embodiment 1 of the present invention. The image pickup apparatus comprises the camera 36 that is installed outdoors and an operation unit 37 that serves as an operation terminal that operates the camera 36 from, for example, indoors both of which are connected via a communication path 38, which is, for example, a wireless network.

The camera 36 has a control CPU 39 that controls a panning/tilting rotation operation and the like in response to an operation from the operation unit 37. The control CPU 39 functions as a camera-side control means that causes the execution of various operations for the entire apparatus based on a computer program stored in a memory (not illustrated).

A panning driving unit 40, a tilting driving unit 41, a rotation driving unit 42, a zoom lens driving unit 43 that comprises the stepping motors 25 and 26, and a focus lens driving unit 44 are connected to the control CPU 39. Additionally, a diaphragm driving unit 45 that comprises the diaphragm unit 16, and an infrared cut filter switching driving unit 46 are connected to the control CPU 39.

The panning driving unit 40, the tilting driving unit 41, and the rotation driving unit 42 respectively have detection means that detect a panning angle, a tilting angle, and a rotation angle of the camera 36, and the control CPU 39 is notified of the detection results.

Specifically, for example, the zoom lens driving unit 43 and the focus lens driving unit 44 respectively have detection means 47 and 48, each of which detects the number of driving pulses of the zoom lens driving unit 43 and the number of driving pulses of the focus lens driving unit 44, and the control CPU 39 is notified of the detection results.

Driving pulse number storage means 49 and 50 that store the number of driving pulses of the stepping motors for the zoom lens 13 and the focus lens 22 are connected to the control CPU 39. Additionally, the control CPU 39 can read out information stored in the drive pulse number storage means 49 and 50 at any time.

Further, a zoom lens position calculation means 51 and a focus lens position calculation means 52 are provided for calculating the number of driving pulses of a motor for driving each of the zoom lens 13 and the focus lens 22 to predetermined positions, based on the number of driving pulses detected by the detection means and the information stored in the storage means. The output of the calculation means 51 and 52 is supplied to the control CPU 39, and the control CPU 39 controls the driving of the zoom lens 13 and the focus lens 22 based on the number of driving pulses of the motor.

The control CPU 39 is supplied with an output of a diaphragm drive arm position detecting means 53 that detects the current rotating angle position of the diaphragm driving arm and an output of a diaphragm drive arm position storing means 54 that sets in advance the rotating angle position of the diaphragm driving arm with respect to a predetermined reference luminance. The output of a diaphragm drive arm position calculation means 55 that calculates the difference between the detected current rotation angle position of the diaphragm driving arm and the rotation angle position stored in the diaphragm driving arm position storage means 54 is supplied to the control CPU 39.

Based on the calculation result, a diaphragm blade held by the driving arm is driven by the diaphragm driving unit 45, and light having an optimum amount of light is made incident on an imaging element in the image pickup element unit 5. The infrared cut filter switching drive unit 46 has a detection means for detecting the position of the filter moving frame 28 holding the infrared cut filter, and the detection result is notified to the control CPU 39.

The calculation means 51, 52 and 55 may be discrete circuits, or at least a part of calculation may be performed by executing a program in the control CPU 39. Additionally, at least a part of the detection processing in the detection means 47, 48 and 53 may be performed by executing a program in the control CPU 39.

The operation unit 37 has an operation unit CPU 56, to which an operation unit 57 is connected that provides instructions for a panning/tilting rotation operation of the camera 36, an opening/closing of diaphragm blades in the diaphragm unit 16, and switching of the infrared cut filter. Accordingly, an operator can operate the operation unit 57 and shoot an object at a desired shooting magnification while confirming an image shot by the camera 36 on the screen of a display unit 58.

The operation unit CPU 56 functions as a control means on the operation unit 37 side, which causes the execution of various operations of the operation unit 37 and the like based on, for example, a computer program stored in a memory (not illustrated) provided in the operation unit 37.

Figure 4A:
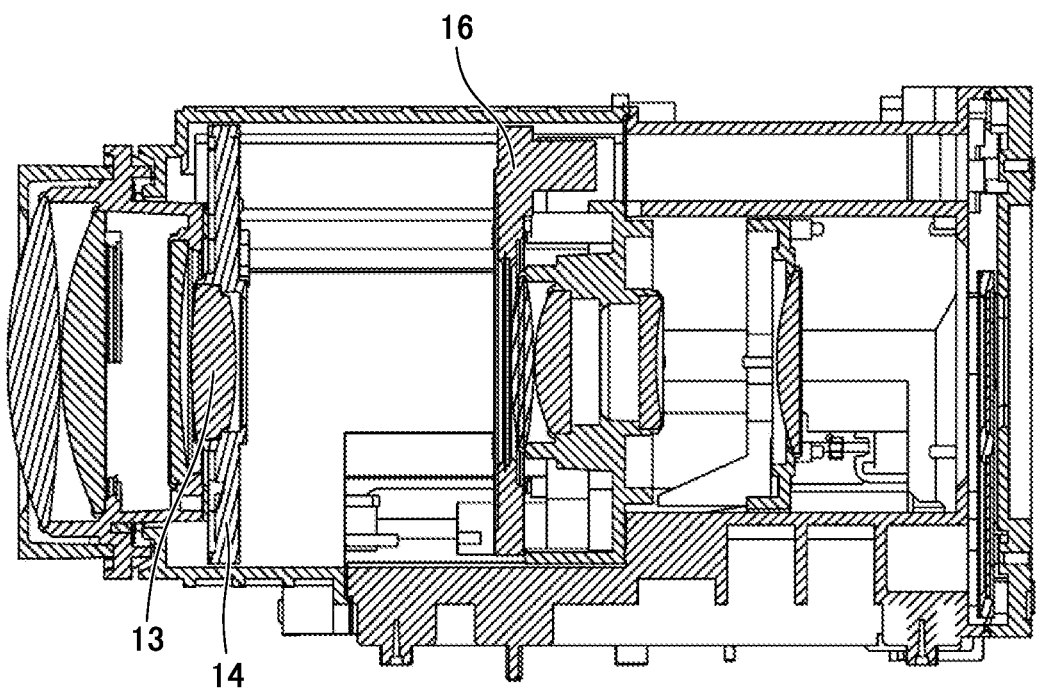
FIG. 4A is a cross-sectional view of the lens barrel showing a lens arrangement at a wide-angle end and FIG. 4B is a cross-sectional view of the lens barrel showing a lens arrangement at a telephoto end.
Figure 4B:
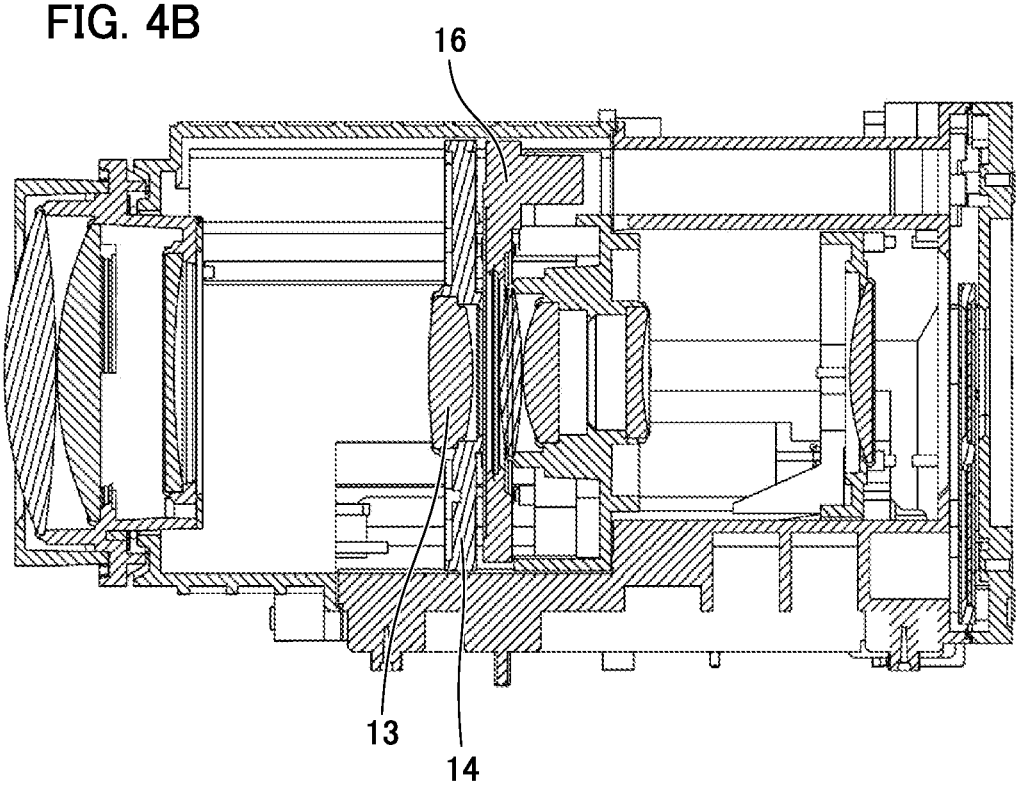

FIG. 4A is a cross-sectional view of the lens barrel illustrating the lens arrangement at the wide-angle end and FIG. 4B is a cross-sectional view of the lens barrel illustrating the lens arrangement at the telephoto end. The zoom lens 13 and the lens moving frame 14 are brought closer to the diaphragm unit 16 as they move from the wide-angle end position to the telephoto end position, and at the telephoto end position, the zoom lens 13 and the lens moving frame 14 are at their closest to the diaphragm unit 16.

Figure 5:
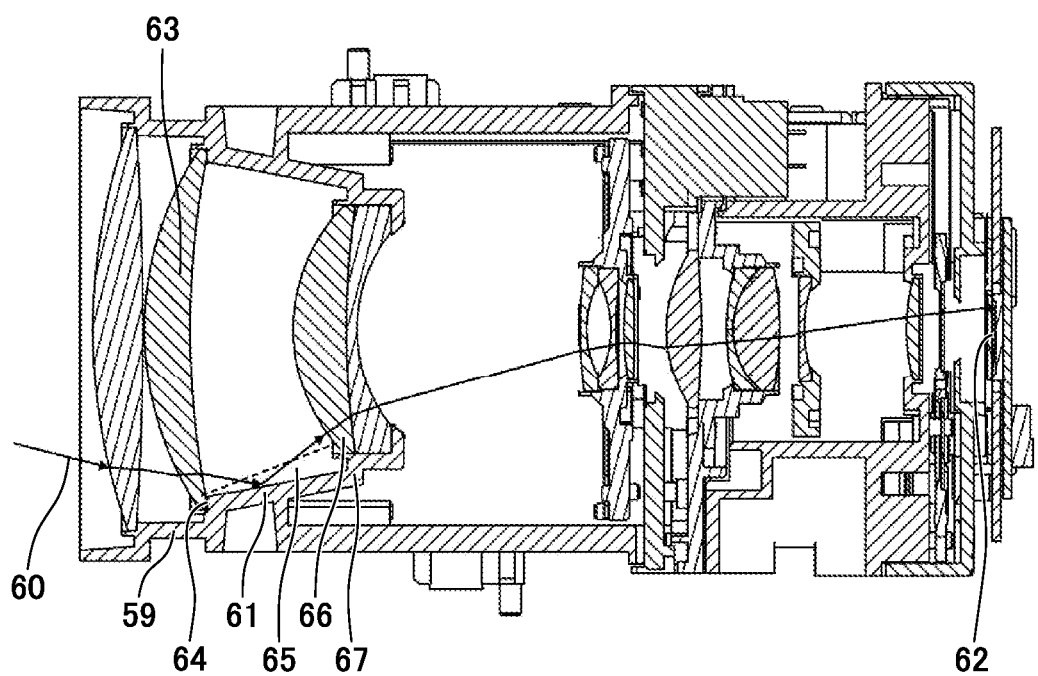
FIG. 5 is a cross-sectional view of the lens barrel for explaining a lens fixing frame 59 in a conventional lens barrel.

Next, FIG. 5 is a cross-sectional view of the lens barrel for explaining the lens fixing frame 59 in a conventional lens barrel. The details of the lens configuration, the driving mechanism, and the like are the same as those described in FIG. 2, and the description will therefore be omitted.

Stray light 60 caused by sunlight or strong light, for example, a head lamp of a vehicle, is reflected on an inner wall portion 61 of the lens fixing frame 59, passes through the lens, and enters an imaging element 62. It is assumed that this is caused by the inner wall portion 61 being located closer to the optical axis than the lens holding position of a lens holding portion 64 of a lens 63, and the difference in diameter with a dotted line 65 that is obtained by connecting effective ray diameters for which excellent imaging is obtained being small.

However, if the inner wall portion that directly connects the lens holding position of the lens holding portion 64 of the lens 63 and the lens holding position of a lens holding portion 67 of a lens 66 is molded from an inexpensive resin member or mold, the slope shown in FIG. 5 is formed.

That is, a slope that is closer to the optical axis of the lens 63 than the lens holding position of the lens holding portion 64 is formed. In contrast, an increase in the tilting accuracy and the eccentricity accuracy of the lens barrel is necessary if a high image quality is required from the lens barrel.

However, if the lens fixing frame 59 is divided according to the lenses 63 and 66, in other words, if a separate lens fixing frame is used, manufacturing errors will accumulate, causing a deterioration in accuracy, and as a result, there are cases in which a high quality image cannot be obtained.

Additionally, if the inner wall portion 61 of the lens fixing frame 59 is farther separated in the radial direction around the optical axis than the dotted line 65 obtained by connecting the effective ray diameters, the lens holding portion 67 of the lens 66 is enlarged in the radial direction, and the size of the entire lens barrel thereby increases.

In the lens holding configuration of Embodiment 1, a plurality of lenses can be held by an integrated lens fixing frame while the inner wall portion 61 is separated away from the dotted line 65 that is obtained by connecting the effective ray diameters in the radial direction around the optical axis. The details of Embodiment 1 will be described below.

Figure 6A:
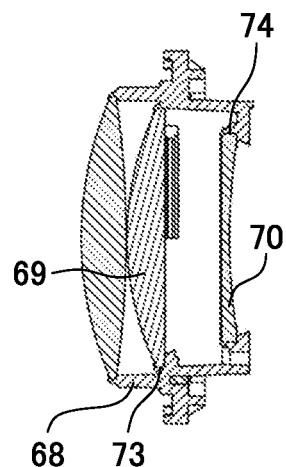
FIG. 6A is a cross-sectional view including an optical axis of a lens fixing frame 68 according to Embodiment 1.
Figure 6B:
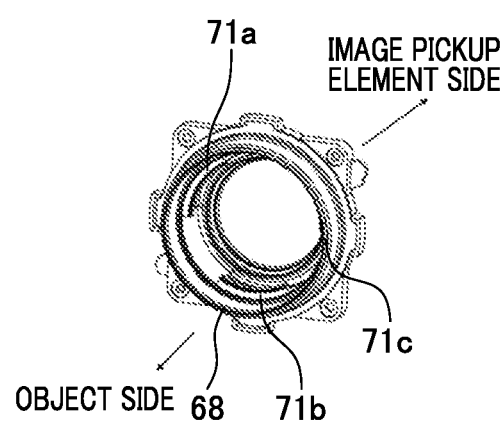
FIG. 6B is a perspective view as viewed from the front (object) side of the lens fixing frame 68.

FIG. 6 illustrates the lens fixing frame 68 of Embodiment 1 of the present invention, FIG. 6A is a cross-sectional view of the lens fixing frame 68 including the optical axis, and FIG. 6B is a perspective view as viewed from the front (object) side of the lens fixing frame 68. FIG. 6C is a perspective view of the lens fixing frame 68 as viewed from the rear (imaging element) side, FIG. 6D is a front view of the lens fixing frame 68, and FIG. 6E is a rear view of the lens fixing frame 68.

Figure 6C:
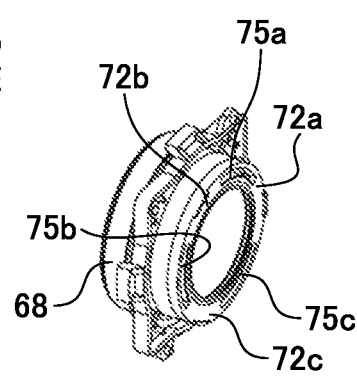
FIG. 6C is a perspective view as viewed from the rear (imaging element) side of the lens fixing frame 68.
Figure 6D:
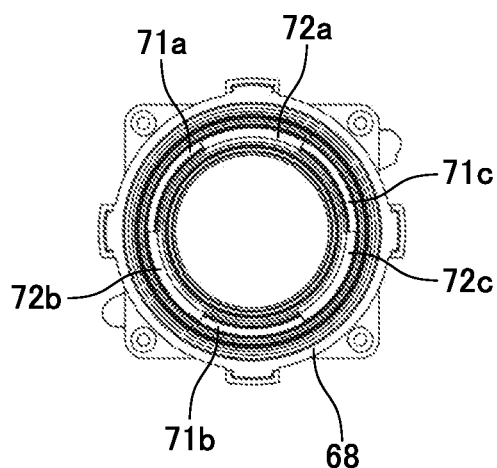
FIG. 6D is a front view of the lens fixing frame 68.

As shown in FIGS. 6B and 6D, first lens holding portions 71a, 71b and 71c that hold the first lens 69 in the optical axis direction are provided. Specifically, the first lens 69 is held by the plurality of first lens holding portions (protrusions) 71a, 71b, and 71c protruding in the optical axis direction from the inner surface of the lens fixing frame 68 and arranged to be separate from each other such that the circumference is divided into three equal parts, and the first lens 69 is fixed by thermocompression.

Thus, the first lens holding portion is configured to have a plurality of protrusions, and the first lens 69 is thereby fixed to the lens fixing frame 68, which serves as the lens barrel, in the radial direction and the optical axis direction.

FIG. 6C illustrates second lens holding portions 72a, 72b, and 72c that hold a second lens 70 disposed on the image plane side (image pickup element side) of the first lens 69 in the optical axis direction. As shown in FIG. 6D, the second lens 70 is held by the plurality of second lens holding portions 72a, 72b, and 72c that are arranged to be separate from each other from the optical axis direction to the radial direction such that the circumference is divided into three equal parts and the second lens 70 is fixed by thermocompression. By this configuration, the second lens 70 can be fixed to the lens fixing frame 68 in the radial direction and the optical axis direction.

Figure 6E:
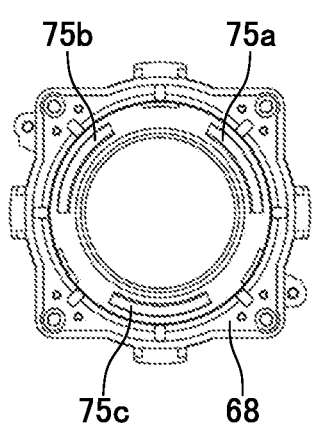
FIG. 6E is a rear view of the lens fixing frame 68.

As shown in FIG. 6C and FIG. 6E, a plurality of openings (through-holes) 75a, 75b and 75c that are provided along the optical axis are provided in the second lens holding portion. As shown in FIG. 6A, an outer diameter 73 of the first lens 69 is larger than an outer diameter 74 of the second lens 70.

Additionally, the first lens holding portions (protrusions) 71a, 71b, and 71c that hold the first lens 69 in the optical axis direction are provided so as to be substantially the same phase as the plurality of openings (through-holes) 75a, 75b, and 75c that are arranged in the second lens holding portions 72a, 72b, and 72c. That is, the first lens holding portion includes a plurality of protrusions that are arranged so as to overlap and cover the plurality of through-holes when viewed from the object side along the optical axis direction.

Thus, it is possible to mold the lens fixing frame 68 out of a resin material in a low cost configuration in which the cavity side and the core side are divided in the optical axis direction. Consequently, it is possible to integrally mold the lens fixing frame 68 of a resin member and increase the tilting accuracy and eccentricity accuracy of the lens member.

The second lens holding portions 72a, 72b, and 72c in the optical axis direction are arranged at substantially equal intervals in the radial direction around the optical axis to the plurality of openings 75a, 75b, and 75c. The second lens holding portions 72a, 72b, and 72c are arranged so as to be different in phase from the first lens holding portions 71a, 71b, and 71c that hold the first lens 69 in the optical axis direction.

Figure 7:
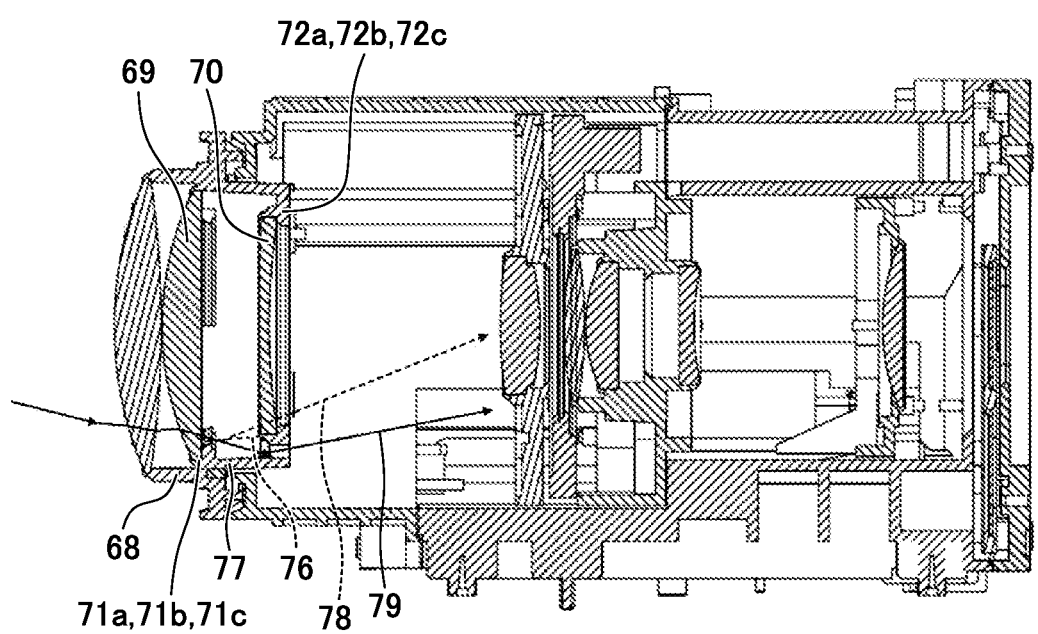
FIG. 7 is a cross-sectional view including an optical axis of the lens barrel at the telephoto end that uses the lens fixing frame 68, and an optical path view of a light ray in stray light according to Embodiment 1.

FIG. 7 is a cross-sectional view including the optical axis of the lens barrel at the telephoto end by using the lens fixing frame 68 and an optical path view of a light ray in the stray light according to Embodiment 1 of the present invention. Note that the lens configuration is different from the conventional example shown in FIG. 5, and an example of a lens configuration that has been specialized for a telephoto lens in which inner wall ghosts and flares occur more easily will be described.

An inner wall portion 77 connecting the first lens holding portions 71a, 71b, and 71c and the second lens holding portions 72a, 72b, and 72c can be configured by using the lens fixing frame 68 that has the configuration described with reference to FIGS. 6A to 6E.

Specifically, the inner wall portion 61 having a tight slope in the conventional lens fixing frame 59 shown in FIG. 5 is not present, and the inner wall portion 77 is a gentle slope or a surface that is substantially parallel to the optical axis, and is configured to significantly separate in the radial direction from a dotted line 76 obtained by connecting the effective ray diameters.

Note that stray light 78 shown by a broken line shows a reflected ray when there is the inner wall portion 61 in the conventional lens fixing frame 59 shown in FIG. 5 between the first lens holding portions 71a, 71b, and 71c and the second lens holding portions 72a, 72b, and 72c. If the stray light 78 shown by a broken line in FIG. 7 exists, the stray light passes through the second lens 70 and reaches the imaging plane as in the example of FIG. 5.

However, when the lens fixing frame 68 of Embodiment 1 of the present invention is used, stray light 79 shown by a solid line can be separated away from the effective ray diameters by the inner wall portion 77. Since the stray light 79 that is reflected on the inner wall portion 77 passes through the outer periphery of the second lens 70, it does not pass through the second lens 70.

By using the lens fixing frame 68 as a lens barrel such as that according to Embodiment 1, it is possible to suppress the influence of ghosts and flares caused by the stray light being reflected on the inner wall, without increasing the size of the entire lens barrel.

Figure 8:
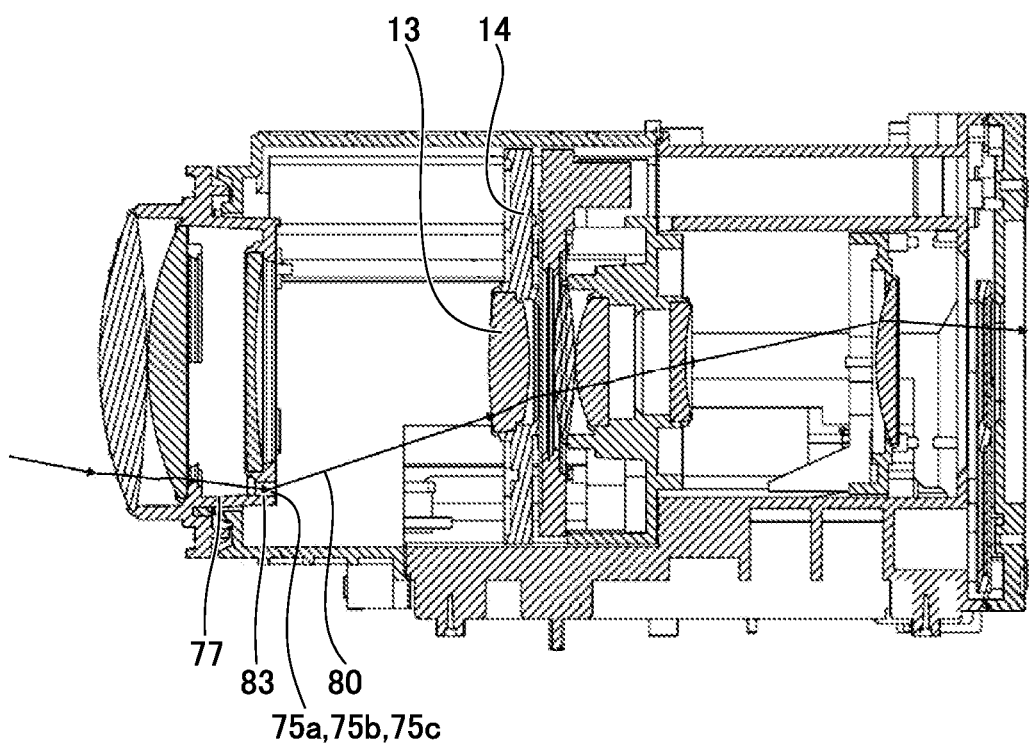
FIG. 8 is a cross-sectional view at the telephoto end and an optical path view of a light 80 in the stray light.

FIG. 8 is a cross-sectional view at the telephoto end and an optical path view of the stray light 80, and as shown in FIG. 8, the influence of the reflection of the stray light on the inner wall portion 77 can be reduced. However, if the stray light 80 is reflected at the openings 75a, 75b, and 75c, the stray light 80 may pass through the zoom lens 13 held by the lens moving frame 14 and reach the imaging plane.

Figure 9A:
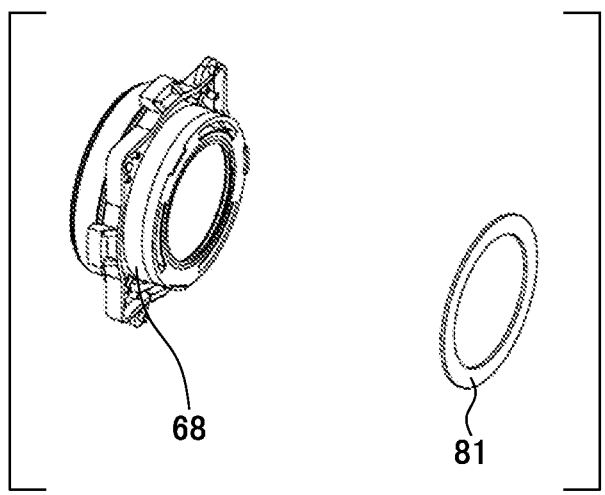
FIG. 9A is an exploded perspective view of the lens fixing frame 68 and the first light shielding member 81.
Figure 9B:
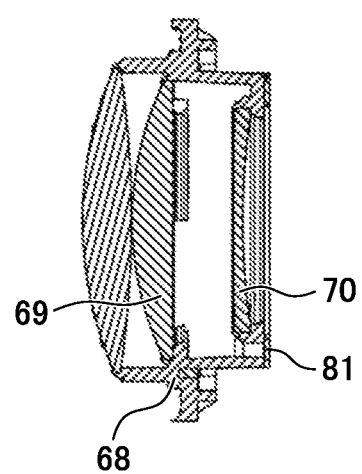
FIG. 9B is a cross-sectional view in which the first light shielding member 81 is attached to the lens fixing frame 68.

Accordingly, in Embodiment 1, the configuration below is used. FIG. 9A is an exploded perspective view of the lens fixing frame 68 and the first light shielding member 81. FIG. 9B is a cross-sectional view illustrating how the first light shielding member 81 is attached to the lens fixing frame 68.

The first light shielding member 81 engages with the lens fixing frame 68 and fixed with an adhesive or the like. Thus, the openings (through holes) 75a, 75b, and 75c are attached and sealed to the lens barrel so as to cover the lens barrel in the optical axis direction, and a light ray in the optical axis direction can thereby be shielded.

Accordingly, as shown in FIG. 8, even if the stray light 80 is reflected at the openings 75a, 75b, and 75c, the stray light will not pass through the zoom lens 13 of the lens moving frame 14 and will not reach the imaging plane. As a result, ghosts and flares caused by rays reflected on the inner wall portion 77 can be suppressed and ghosts and flares caused by rays reflected on the inner wall 83 due to the openings 75a, 75b and 75c can also be suppressed.

Figure 10A:
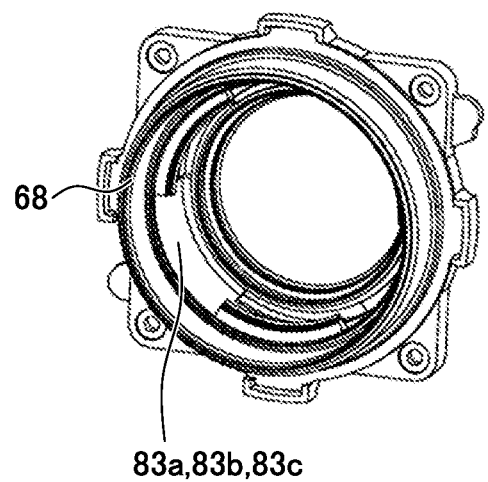
FIG. 10A is a perspective view of the lens fixing frame 68.

Next, the lens fixing frame 68 of Embodiment 1 further includes the second light shielding portion below. FIG. 10A is a perspective view of the lens fixing frame 68 and FIG. 10B is a cross-sectional view of the zoom lens barrel 4 that is mounted on the lens fixing frame 68 on which the second light shielding member 82 and the first light shielding member 81 are not mounted.

In FIG. 10A, as in FIG. 6, the holding portions (protrusions) 70a, 71b, and 71c of the first lens 69 are arranged so as to be separate from each other such that the circumference is divided into three equal parts in the radial direction around the optical axis. As a result, spaces 83a, 83b, and 83c that do not hold the first lens 69 (that do not have protrusions) exist.

Figure 10B:
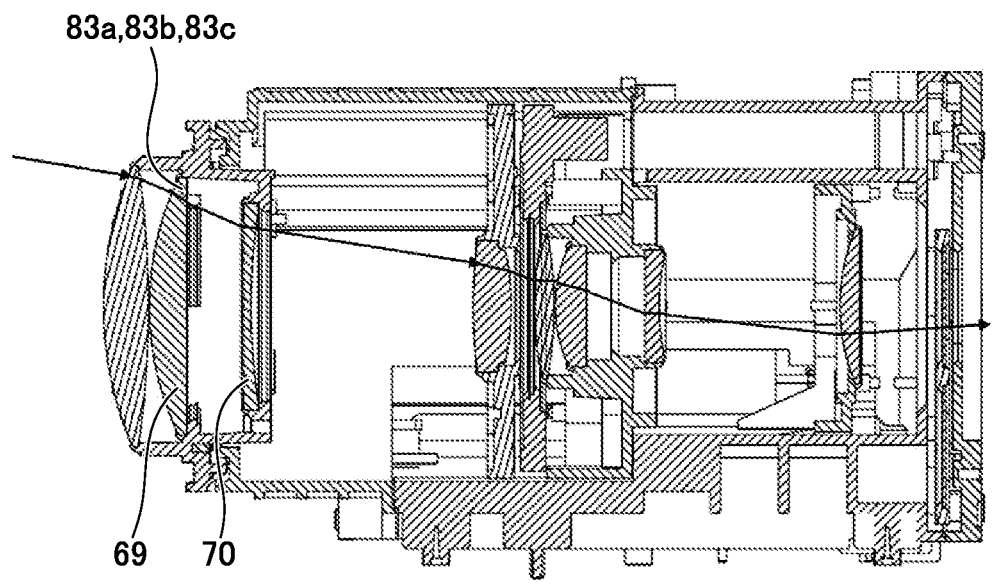
FIG. 10B is a cross-sectional view of the zoom lens barrel 4 mounted with the lens fixing frame 68 on which the second light shielding member 82 and the first light shielding member 81 are not mounted.

As shown in FIG. 10B, when the first lens 69 is held, the stray light that has passed through the spaces 83a, 83b, and 83c that do not hold the first lens 69 passes through the second lens 70 and reaches the imaging plane, and flares that cause a deterioration in the resolution may thereby occur. In Embodiment 1, a second light shielding member is provided for shielding the peripheral portion on the incident surface side of the first lens for the purpose of suppressing flares.

Figure 11A:
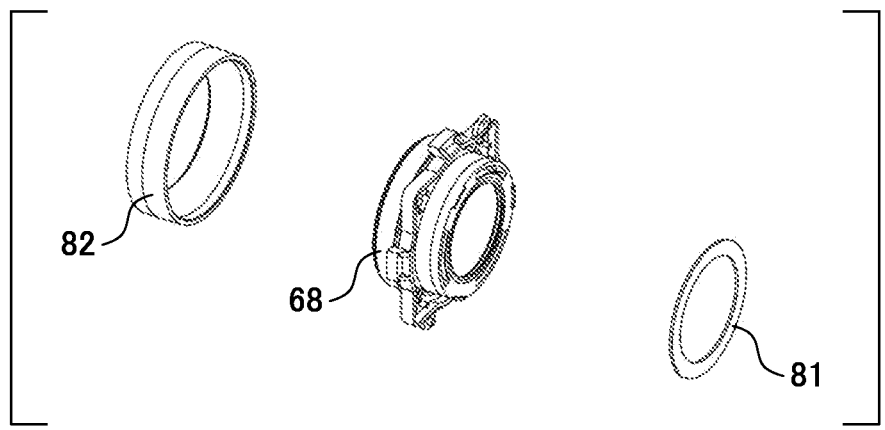
FIG. 11A is an exploded perspective view of the second light shielding member 82, the lens fixing frame 68, and the first light shielding member 81.
Figure 11B:
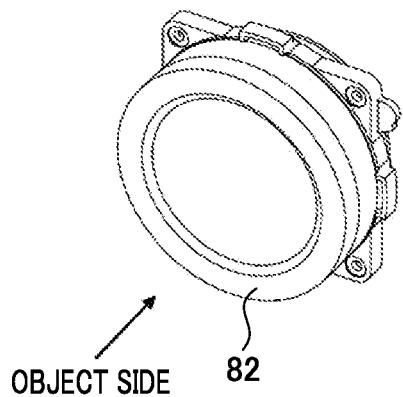
FIG. 11B is a perspective view of the second light shielding member 82 as viewed from the object side.
Figure 11C:
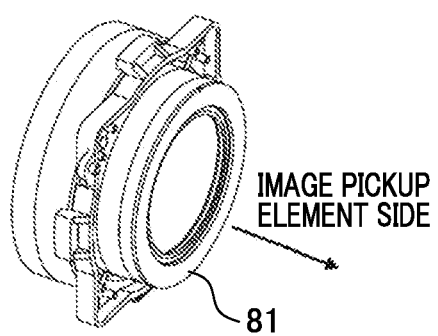
FIG. 11C is a perspective view of the first light shielding member 81 as viewed from the image pickup device side.
Figure 11D:
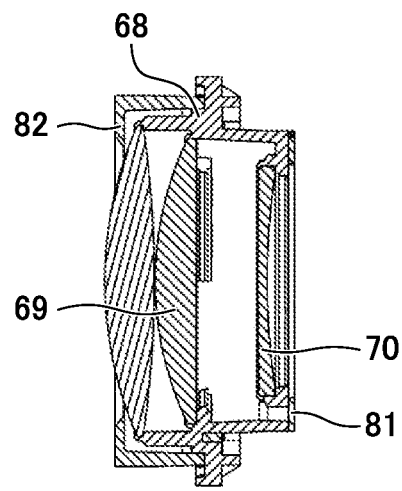
FIG. 11D is a cross-sectional view illustrating that the second light shielding member 82 and the first light shielding member 81 are attached to the lens fixing frame 68.

FIG. 11A is an exploded perspective view of the second light shielding member 82, the lens fixing frame 68, and the first light shielding member 81. FIG. 11B is a perspective view of the second light shielding member 82 viewed from the object side and FIG. 11C is a perspective view of the first light shielding member 81 viewed from the imaging element side. FIG. 11D is a cross-sectional view illustrating that the second light shielding member 82 and the first light shielding member 81 are mounted on the lens fixing frame 68. The second light shielding member 82 engages with the lens fixing frame 68 and is fixed with an adhesive.

The second light shielding member 82 and the first light shielding member 81 may be resin members or a members made from materials such as sheet metal, and may be attached by adhesion. Additionally, the second light shielding member 82 and the first light shielding member 81 may be provided with a positioning boss or the like in order to precisely limit the light shielding range, or double-sided tape may be used for the attachment of the second light shielding member 82 and the first light shielding member 81 to the lens fixing frame 68.

Thus, the second light shielding member 82 covers a plurality of spaces 83a, 83b, and 83c that do not hold the first lens 83. That is, the second light shielding member 82 is configured so as to cover at least a portion of the first lens holding portion other than the plurality of protrusions when viewed from the object side (object side) along the optical axis direction.

Figure 12:
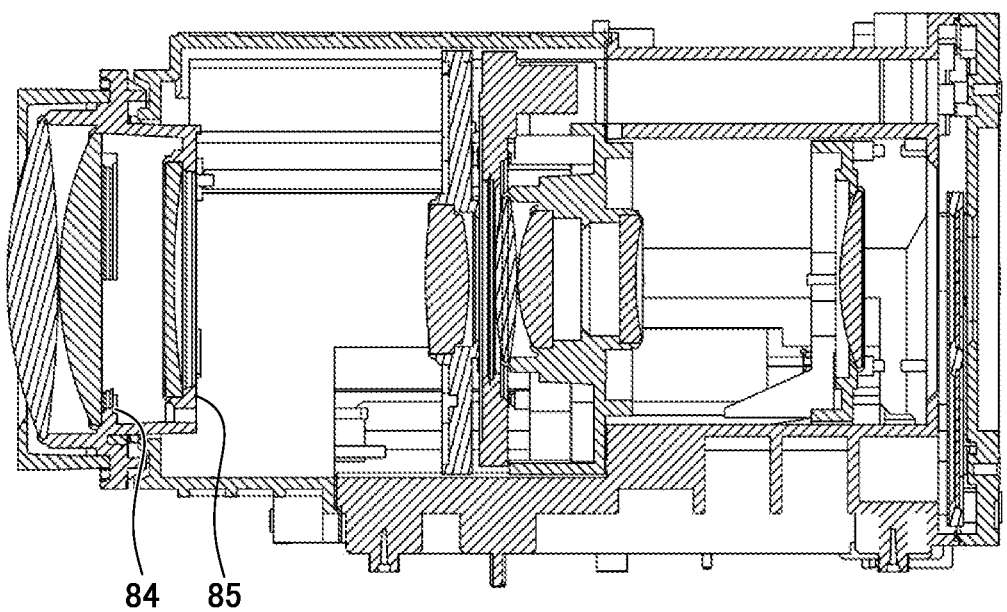
FIG. 12 is a cross-sectional view of the zoom lens barrel 4 at the telephoto end when the second light shielding member 82 and the first light shielding member 81 are mounted on the lens fixing frame 68.

FIG. 12 is a cross-sectional view of the zoom lens barrel 4 at the telephoto end when the second light-shielding member 82 and the first light-shielding member 81 are mounted on the lens fixing frame 68.

Thus, the second light shielding member 82 is provided to shield the stray light through the spaces 83a, 83b, and 83c between the first lens holding portions 71a, 71b, and 71c by dividing the holding portion of the first lens 69 into three equal parts in the radial direction around the optical axis. Surfaces 84 and 85 that are the rear side (imaging element side) of the lens contacting surface of the first lens holding portions 71a, 71b, and 71c and the second lens holding portions 72a, 72b, and 72 are formed to be at a substantially right angle to the optical axis direction.

In particular, this configuration is effective in a lens optical system in which the refractive index of the first lens 69 is relatively high and the refractive index of the second lens 70 is relatively low. Specifically, this is due to it being impossible to ignore ghosts caused by a small amount of scattered light on the inner wall portion that is provided parallel to the optical axis or provided obliquely to the optical axis, which is not formed in a shape to be at a substantially right angle to the optical axis, because it is conceivable that the stray light from the first lens 69 is reflected on the inner wall of the lens fixing frame 68 in a manner that is substantially perpendicular to the optical axis. Such a phenomenon is likely to occur in a zoom lens specialized in a telephoto system.

Hence, having the surfaces 84 and 85 be formed to have a shape that is substantially at a right angle to the optical axis is effective at suppressing ghosts and the like in an image pick up apparatus that supports low-light intensity and is primarily used for nighttime shooting, such as a surveillance camera. Note that it is also possible for just one of the surfaces 84 and 85, which are the rear side of the lens contacting surface, to be formed to be at a substantially right angle to the optical axis direction.

As described above, a plurality of through-holes is provided along the optical axis direction in the periphery of the second lens holding portion, and the first lens holding portion includes a plurality of protrusions arranged so as to overlap and cover the plurality of through-holes when viewed from the object side along the optical axis direction. Therefore, the lens fixing frame 68 of the resin member can be easily made an integrated configuration, and a lens barrel with a high holding accuracy can be realized while reducing the outer diameter of the first lens 69 and the second lens 70.

Furthermore, when the first light shielding member 81 and the second light shielding member 82 are provided, ghosts and flares from the inner wall portion 77 can be further suppressed. Additionally, as the result of forming the surfaces 84 and 85 on the rear side (imaging element side) of the lens contact surface so as to be at a substantially right angle to the optical axis direction, a lens barrel that can further suppress ghosts and flares can be realized.

Embodiment 2

Next, a configuration of a lens barrel according to Embodiment 2 of the present invention will be described with reference to FIGS. 13A and 13B. Since the basic configuration other than a diaphragm mechanism is shared with Embodiment 1, the explanation of the basic configuration will be omitted.

It is known that ghosts and flares caused by stray light can also occur due to the reflection on the lens and the surfaces of the diaphragm blade that are placed in close proximity to each other at the diaphragm position. Next, an example of the diaphragm unit 16 will be described with reference to FIGS. 13A and 13B.

Figure 13A:
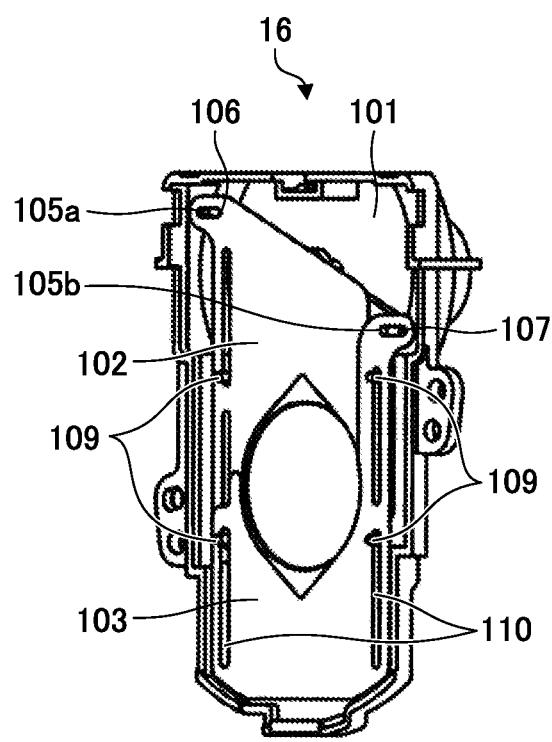
FIG. 13A is a front view of a diaphragm unit 16 in Embodiment 2 and FIG. 13B is a cross-sectional view including the optical axis of the diaphragm unit.
Figure 13B:
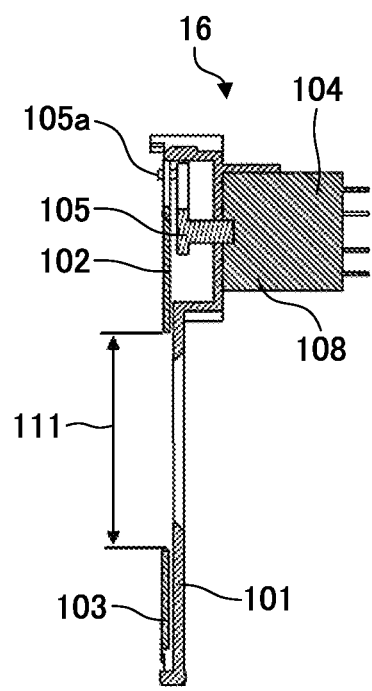

FIG. 13A is a front view of the diaphragm unit 16 and FIG. 13B is a cross-sectional view including the optical axis of the diaphragm unit. The diaphragm unit 16 is a device that adjusts an amount of light, and two diaphragm blades 102 and 103 are slidably arranged on a base plate 101 that serves as a base member having an opening around the optical axis through which incident light passes.

Further, a galvanometer 104 that serves as a driving source is attached to the base plate 101 and a driving arm 105 is connected to a rotating shaft (not illustrated) that is attached to the galvanometer 104.

Pins 105a and 105b that are provided at both ends of the drive arm 105 respectively engage with long holes 106 and 107 provided on the diaphragm blades 102 and 103 to hold the diaphragm blades, and the diaphragm blades 102 and 103 are made to slide toward each other in directions that are substantially perpendicular to the optical axis. The galvanometer 104 that serves as a driving source unit generates a magnetic field by a yoke 108 and a coil (not illustrated) inside the meter.

A Hall element (not illustrated) inside the meter, which serves as a magnetic sensor, detects a rotation angle of the drive arm 105 and a current control is performed to the galvanometer 104. Thus, the drive arm 105 rotates around the rotation axis by the energization of the galvanometer 104, and the diaphragm unit 16 is thereby driven.

That is, the diaphragm blades 102 and 103 in which the pins 105a and 105b that are provided at both ends of the drive arm 105 engage with the long holes 106 and 107 slide along the long grooves 110 that are engaged with the guide pins 109 that are provided on the base plate 101.

Accordingly, the rotating motion of the drive arm 105 is converted into a linear motion in the diaphragm blades 102 and 103, and the diaphragm blades 102 and 103 are driven linearly in directions opposite to each other that are substantially perpendicular to the optical axis direction. Thus, the aperture diameter of the opening 111 formed by the diaphragm blades 102 and 103 is freely changed by changing an input current to the galvanometer 104, and the amount of incident light can thereby be adjusted.

Figure 14A:
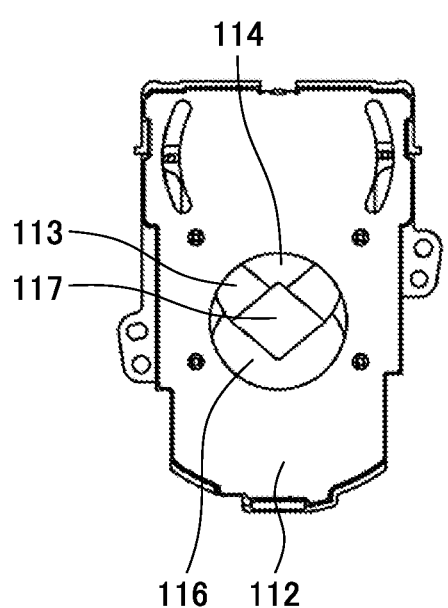
FIG. 14A illustrates a state of the aperture of the diaphragm unit 16 in Embodiment 2 when the cover 112 is attached.
Figure 14B:
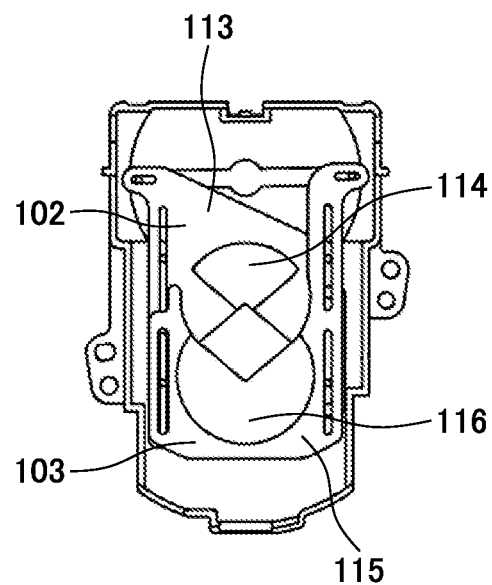
FIG. 14B illustrates a state of the aperture of the diaphragm unit 16 when the cover 112 is removed.

FIG. 14A illustrates a state of the diaphragm of the diaphragm unit 16 when a cover 112 is attached. Stray light at a part larger than the aperture diameter of the diaphragm can be cut by the cover 112. FIG. 14B illustrates a state of the diaphragm of the diaphragm unit 16 when the cover 112 is removed.

The diaphragm blade 102 at the upper side of a diamond-shaped opening 117 in FIG. 14 has a first region 113 and a second region 114, and the diaphragm blade 103 at the lower side of the diamond-shaped opening 117 has a first region 115 and a second region 116.

The second regions 114 and 116 of the diaphragm blades are regions on an object side that are not in contact with each other when the diaphragm opens and closes. In addition, the second regions 114 and 116 are the regions above and below the aperture 117 of the diaphragm blade where reflection is likely to occur between the surface of the diaphragm blade and the lens surface when the lens is placed in close proximity to the diaphragm.

Accordingly, in Embodiment 2, a coating having a high light shielding property is applied to or a flocked paper or the like is pasted on the second regions 114 and 116 of the diaphragm blades 102 and 103 so as to reduce the reflectance although the slidability becomes comparatively poor. That is, the light shielding property of a region where the plurality of diaphragm blades does not contact each other when the diaphragm opens and closes is made higher than that for the other regions of the diaphragm blades. Accordingly, reflection between the surface of the diaphragm blade and the lens surface can be reduced, and ghosts and flares can be reduced.

Figure 15:
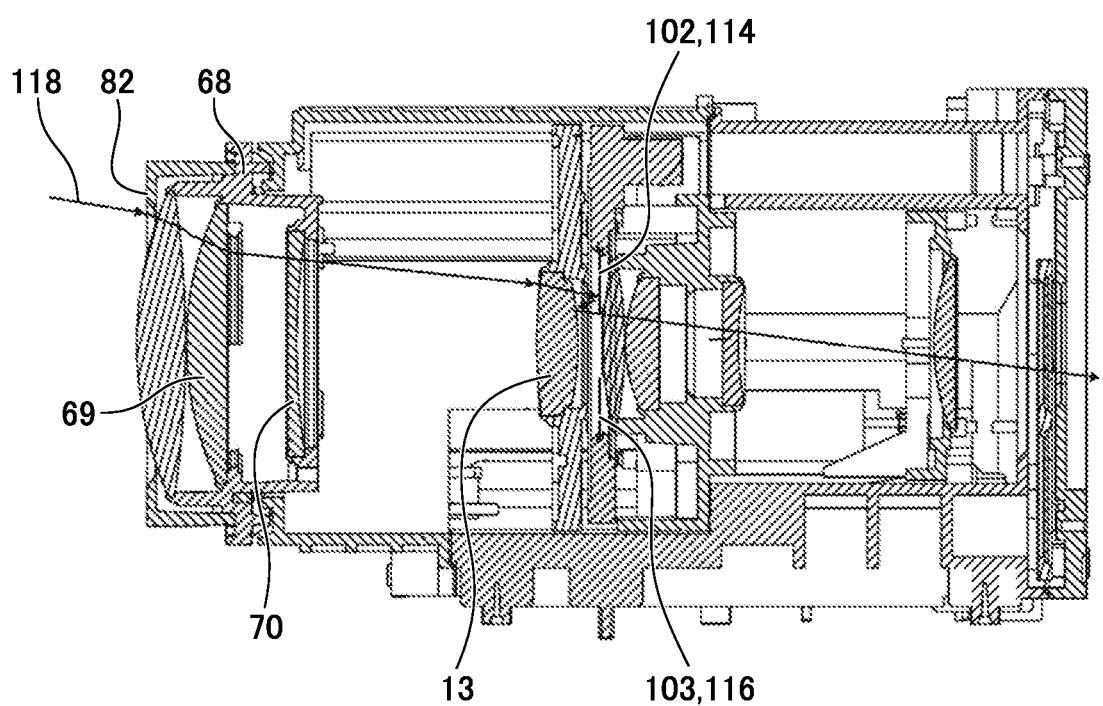
FIG. 15 is a cross-sectional view of the lens barrel to which the second light shielding member 82, the lens fixing frame 68, and the diaphragm unit 16 are attached according to Embodiment 2.

FIG. 15 is a cross-sectional view of the lens barrel attached to the second light shielding member 82, the lens fixing frame 68, and the diaphragm unit 16 according to Embodiment 2 and illustrates a telephoto end position. Although the first light shielding member 81 is omitted, it may be provided. A light ray 118 indicates a light that reaches the image pickup element due to the surface reflection at each of the regions 114 and 116 of the diaphragm blades 102 and 103 and the zoom lens 13.

The intensity of the light ray 118 can be reduced by a region having a high light shielding property being provided in the second regions 114 and 116 of the diaphragm blade. Accordingly, not only ghosts and flares caused on the inner wall portion of the lens fixing frame 68, but also ghosts and flares caused by the surface reflection that occurs when the diaphragm blades 102 and 103 and the zoom lens 13 are placed in close proximity to each other can be suppressed.

As described above, according to the lens barrel of Embodiment 2, the lens fixing frame 68 of a resin member can be easily made an integrated configuration, the outer diameter of the first lens 69 and the second lens 70 can be reduced, and the holding accuracy for the lenses 69 and 70 can be further enhanced. Furthermore, not only the ghosts and flares caused by the inner wall portion but also the ghosts and flares that occur between the diaphragm blades 102 and 103 and the zoom lens 13 can be suppressed.

In Embodiment 2, although only the diaphragm unit of the lens barrel of Embodiment 1 is changed, the diaphragm unit of Embodiment 2 is also applicable to a typical lens barrel that is different from the lens barrel of Embodiment 1. That is, the diaphragm unit is applicable to a lens barrel for holding a lens that is provided with a diaphragm mechanism having a plurality of diaphragm blades.

When the lens barrel of Embodiments 1 and 2 is combined with an image pickup apparatus having an image pickup element for capturing an image formed by the lens barrel, a high quality image with less ghosts and flares can be captured by the downsized lens barrel, and the performance of the image pickup apparatus thereby improves.

While the present invention has been described with reference to exemplary embodiments, it is to be understood that the invention is not limited to the disclosed exemplary embodiments. The scope of the following claims is to be agreed the broadest interest to encode all such modifications and equivalent structures and functions.

For example, although Embodiments 1 and 2 describe that the operation unit 37 and the camera 36 are provided separately to be connected via the communication path 38 and the like, the operation unit 37 and the camera 36 may be integrated. That is, the image pickup apparatus in Embodiments 1 and 2 includes the operation unit 37 and the camera 36 that are separated or integrated.

In addition, as a part or the whole of the control according to this embodiment, a computer program realizing the function of the embodiment described above may be supplied to the image pickup apparatus through a network or various storage media. Then, a computer (or a CPU, an MPU, or the like) of the image pickup apparatus may be configured to read and execute the program. In such a case, the program and the storage medium storing the program configure the present invention.

This application claims the benefit of Japanese Patent Application No. 2020-215210 filed on Dec. 24, 2020, which is hereditary incorporated by reference herein in its entirety.

What is claimed is:

1. A lens barrel comprising:
a first lens holding portion that holds a first lens; and
a second lens holding portion that holds a second lens disposed further toward an image plane side than the first lens,
wherein the outer diameter of the first lens is larger than the outer diameter of the second lens,
wherein a plurality of through-holes along an optical axis direction of the first lens and the second lens is provided in the second lens holding portion, and
wherein the first lens holding portion includes a plurality of protrusions arranged so as to overlap the plurality of through-holes if viewed from an object side along the optical axis direction,
wherein a first light shielding member for covering the plurality of through-holes is attached to the second lens holding portion.

2. The lens barrel according to claim 1 further comprising a second light shielding member for shielding a peripheral portion on an object side of the first lens.

3. The lens barrel according to claim 2,
wherein the second light shielding member covers at least a portion of the first lens holding portion other than the plurality of protrusions if viewed from the object side along the optical axis direction.

4. The lens barrel according to claim 1,
wherein a surface at the rear side of a lens contacting surface of at least one of the first lens holding portion and the second lens holding portion is formed to be at a substantially right angle to the optical axis.

5. The lens barrel according to claim 1 further comprising a diaphragm mechanism having a plurality of diaphragm blades of which light shielding property of a region where the plurality of diaphragm blades does not contact each other when the diaphragm opens and closes is made higher than that of the other regions of the diaphragm blades.

6. An image pickup apparatus comprising;
a lens barrel;

an image pickup element for capturing an image formed through the lens barrel;

wherein the lens barrel comprising:

a first lens holding portion that holds a first lens; and a second lens holding portion that holds a second lens disposed further toward an image plane side than the first lens, wherein the outer diameter of the first lens is larger than the outer diameter of the second lens, wherein a plurality of through-holes along an optical axis direction of the first lens and the second lens is provided in the second lens holding portion, and wherein the first lens holding portion includes a plurality of protrusions arranged so as to overlap the plurality of through-holes if viewed from an object side along the optical axis direction, and wherein a first light shielding member for covering the plurality of through-holes is attached to the second lens holding portion.

7. A lens barrel comprising:

a first lens holding portion that holds a first lens;

a second lens holding portion that holds a second lens disposed further toward an image plane side than the first lens;

a light shielding member for shielding a peripheral portion on an object side of the first lens; and wherein the outer diameter of the first lens is larger than the outer diameter of the second lens, wherein a plurality of through-holes along an optical axis direction of the first lens and the second lens is provided in the second lens holding portion, and wherein the first lens holding portion includes a plurality of protrusions arranged so as to overlap the plurality of through-holes if viewed from an object side along the optical axis direction.

8. The lens barrel according to claim 7, wherein the light shielding member covers at least a portion of the first lens holding portion other than the plurality of protrusions if viewed from the object side along the optical axis direction.

9. The lens barrel according to claim 7, wherein another light shielding member for covering the plurality of through-holes is attached to the second lens holding portion.

10. The lens barrel according to claim 7, wherein a surface at the rear side of a lens contacting surface of at least one of the first lens holding portion and the second lens holding portion is formed to be at a substantially right angle to the optical axis.

11. The lens barrel according to claim 7 further comprising a diaphragm mechanism having a plurality of diaphragm blades of which light shielding property of a region where the plurality of diaphragm blades does not contact each other when the diaphragm opens and closes is made higher than that of the other regions of the diaphragm blades.

12. The lens barrel according to claim 1, wherein the first lens holding portion and the second lens holding portion are integrally formed.

\* \* \* \* \*